Oct. 1, 1957 W. P. OEHLER ET AL 2,808,181
PLANTER
Filed June 1, 1954 2 Sheets-Sheet 1
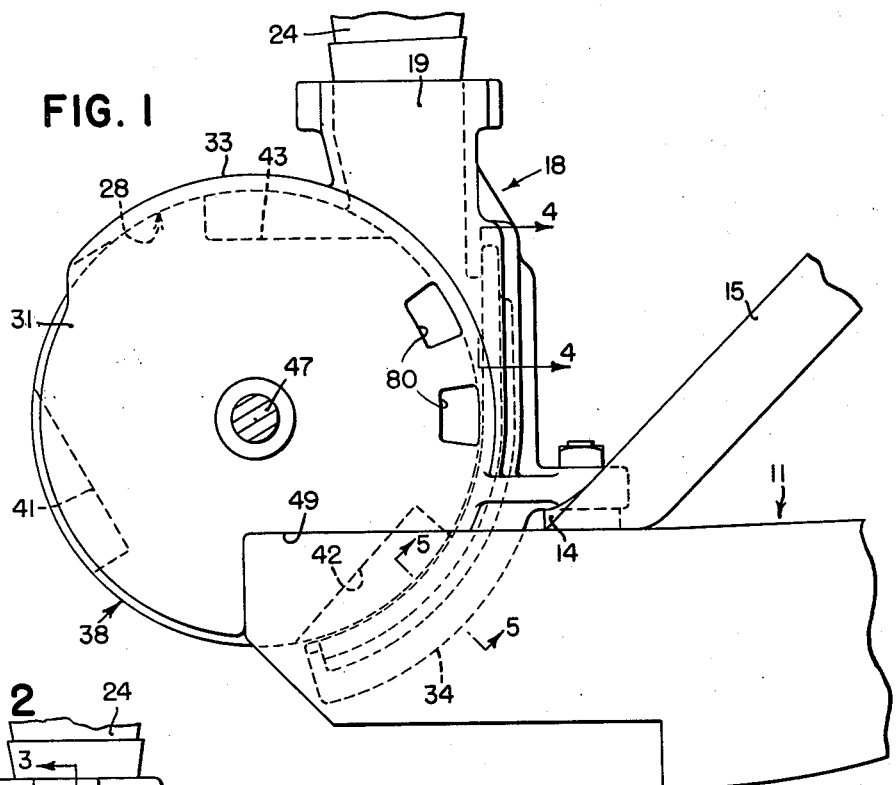
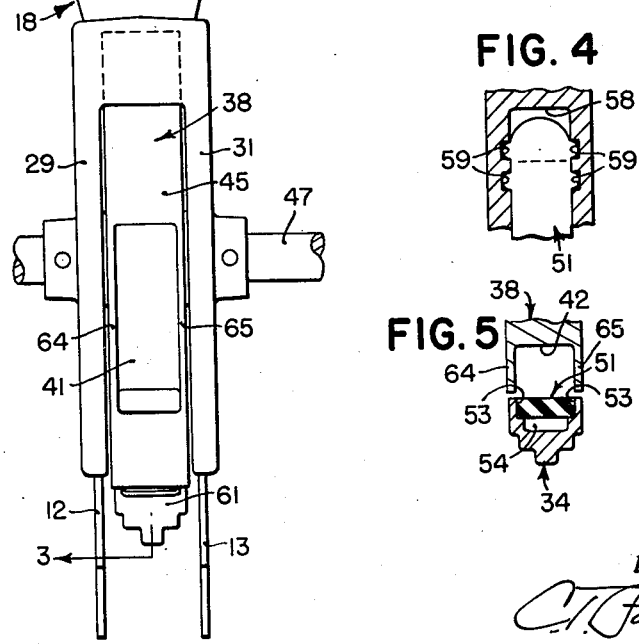
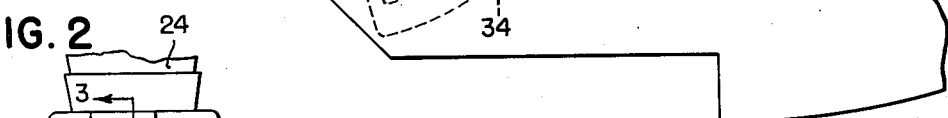
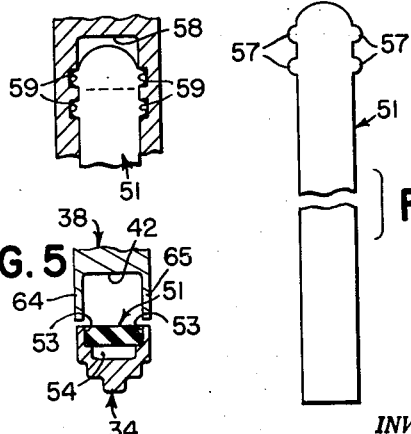
INVENTORS.
WILLIAM P. OEHLER
LESLIE W. JOHNSON
BY
ATTORNEYS Oct. 1, 1957 W. P. OEHLER ET AL 2,808,181
PLANTER
Filed June 1, 1954 2 Sheets-Sheet 2
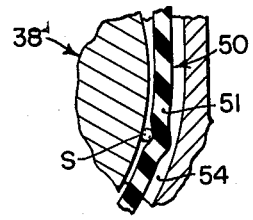
FIG. 6
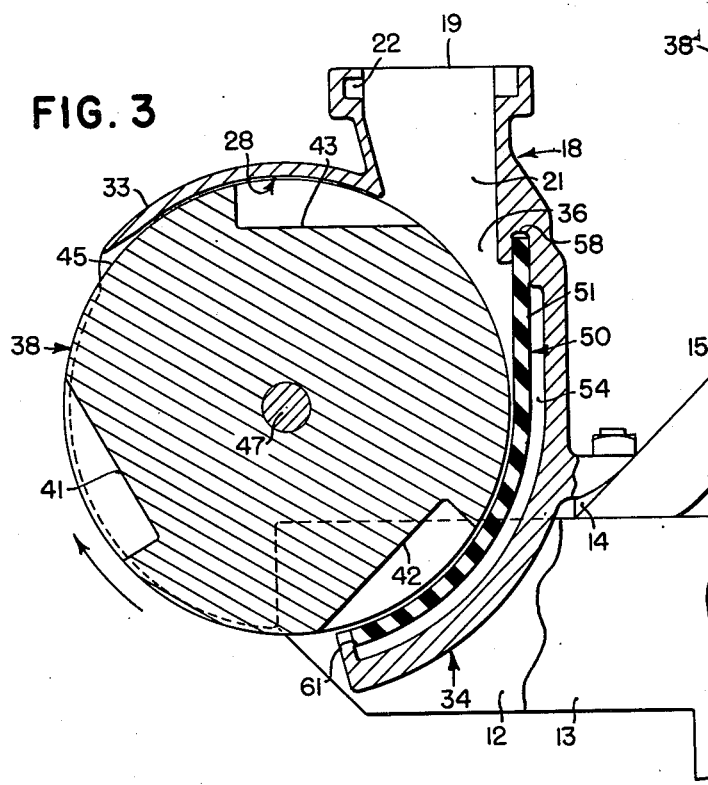
FIG. 3
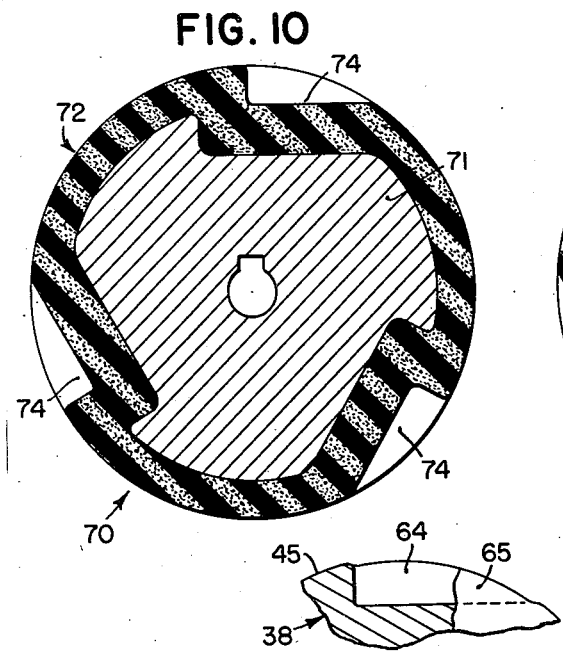
FIG. 10
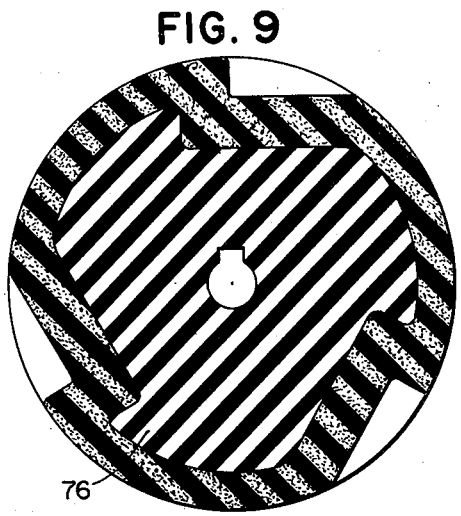
FIG. 9
FIG. 8
INVENTORS.
WILLIAM P. OEHLER
LESLIE W. JOHNSON
BY
ATTORNEYS

United States Patent Office 2,808,181
Patented Oct. 1, 1957

2,808,181
PLANTER

William P. Oehler and Leslie W. Johnson, Moline, Ill., assignors to Deere & Company, Moline, Ill., a corporation of Illinois Application June 1, 1954, Serial No. 433,354

13 Claims. (Cl. 222—368)

The present invention relates generally to agricultural implements and more particularly to planters and the like in which it is desired to deposit seeds in a plurality of spaced apart groups called hills, such as is frequently done when planting cotton seed.

The object and general nature of this invention is the provision of a hill-drop planter mechanism especially constructed and arranged to segregate or separate the seed into groups or hills without danger of cracking or breaking any of the seeds. Further, it is a feature of this invention to provide a hill-drop mechanism utilizing a celled seed wheel for separating the seed, with improved cut-off means that practically eliminates all seed cracking and breaking. More specifically, it is a feature of this invention to provide a hill-drop mechanism in which a rubber strip is used in conjunction with a rotary celled hill-drop seed wheel whereby any seed that should become caught in between the rotary seed wheel and the cut-off strip is not cracked or broken, and the cut-off strip closes against the seed wheel immediately behind the seed caught between strip and the seed wheel, whereby the other seed does not follow the first seed to aggravate the seed jammed condition.

These and other objects and desirable features and advantages of the present invention will be apparent to those skilled in the art after a consideration of the following detailed description, taken in conjunction with the accompanying drawings, in which:

Fig. 1 is a side view of a hill-drop attachment for cotton planters, in which the principles of the present invention have been incorporated.

Fig. 2 is a rear view looking forwardly of the construction shown in Fig. 1.

Fig. 3 is a sectional view taken generally along the line 3—3 of Fig. 2.

Fig. 4 is a fragmentary sectional view taken along the line 4—4 of Fig. 1, showing the method of securing the rubber-like cut-off strip in place in the seed boot.

Fig. 5 is a sectional view taken along the line 5—5 of Fig. 1.

Fig. 6 is a fragmentary view showing the action of the flexible cut-off strip in accommodating the presence of an extra seed between the body of the wheel and the cut-off strip.

Fig. 7 is a face view of the rubber cut-off strip.

Fig. 8 is a fragmentary detail view of the cell construction of the hill-drop wheel shown in Figs. 1, 2 and 3.

Fig. 9 is a sectional view showing a modified form of celled hill-drop wheel.

Fig. 10 is a similar sectional view of another modified form of hill-drop wheel.

Referring first to Fig. 1, the planter in which the principles of the present invention have been incorporated is illustrated as equipped with a furrow-opening runner 11 formed at its rear end with laterally spaced apart plate sections 12 and 13 and having an attaching member 14 that includes a forwardly extending brace section 15. The planter also includes a seed boot casting 18 having an upper portion 19 the interior of which forms a seed chamber 21 (Fig. 3), said upper portion 19 having means, such as a groove or recess 22, to receive the lower end of a ribbon tube 24 through which seeds are continuously dropped into the seed chamber 21.

The seed boot casting 18 is also formed with a seed wheel receiving chamber 28 formed in part by a pair of side sections 29 and 31 (Fig. 2) and upper and lower peripheral sections 33 and 34. The seed chamber 21 communicates with the hill-drop wheel chamber 28 through a throat section 36 (Fig. 3) disposed generally at the upper and forward side of the chamber 28.

The hill-drop wheel, normally rotatably disposed within the chamber 28, is a generally cylindrical member indicated in its entirety by the reference numeral 38 and is formed with three seed-receiving cells or recesses 41, 42 and 43 (Fig. 3), these cells 41, 42 and 43 being spaced apart uniformly around the periphery of the wheel 38. The sections 45 of the wheel between the seed cells are smooth and lie in a generally cylindrical surface, the center of which coincides with a driving shaft 47 journaled for rotation within the side sections 29 and 31 of the boot 18, the wheel 38 being secured to the shaft 47 by any suitable means. As best seen in Fig. 1, the side sections 29 and 31 of the seed boot casting 18 are formed with notches 49 to receive the upper rear corners of the rear runner plate sections 12 and 13. Suitable means (not shown) is connected with the shaft 47 to turn the seed wheel in the direction of the arrow shown in Fig. 3.

According to the principles of the present invention, new and improved cut-off means is provided for separating the seed in the cells 41—43 from the seed remaining in the seed chamber 21. In the present instance, the cut-off means is indicated in its entirety by the reference numeral 50 and includes a flexible strip 51 of rubber-like yielding material that is adapted to seat in shouldered sections 53 formed in the lower seed boot extension 34 and the upwardly contiguous part of the seed boot casting. A groove 54 is formed in the member 18 underlying the cut-off strip 51, as best shown in Fig. 5, so that the strip 51 is free to flex outwardly away from the wheel 38. At its upper end, the strip 51 is formed with a plurality of knobs or lugs 57, and this end of the strip 51 is received within a socket 58 formed in the seed boot casting 18 immediately above the upper portion of the groove 54. The socket 58 is provided with recesses 59 to receive the lugs 57. The groove or recess 54 is closed at the lower end of the boot extension 34 by a transverse end wall 61.

The seed cells 41—43 are formed in the peripheral portion of the wheel 38, but they do not extend all the way across the wheel; instead, each is provided with side walls 64 and 65 (Fig. 2), and each side wall 64, 65 lies in the plane of the side portions of the adjacent parts of the wheel periphery. As best shown in Fig. 8, these side wall sections 64 and 65 do not extend radially outwardly quite as far as the intermediate peripheral portions 45 of the wheel. The general peripheral surface of the wheel 38 is ground, machined or polished so as to be quite smooth, and it has been found that in the casting operation, due to the fact that they are relatively thin portions, the side wall sections 64 and 65 are harder than the main peripheral sections 45 of the wheel. Accordingly, to facilitate the machining and like operations, the edges of these side wall sections 64 and 65 are formed so as to terminate slightly below or radially inwardly of the cylindrical surface that contains the wheel portions 45. While this construction is indicated in Fig. 8, the showing of this particular arrangement is omitted in the other figures for purposes of clarity.

In operation, the structure described above forms a very efficient and rapidly operating machine for separating seeds, such as cotton seed, into groups or hills, each containing a plurality of seeds. The upper portion of the cut-off strip 51 extends tangentially, as best shown in Fig. 3, while the lower portion extends snugly in embracing relation about the periphery of the seed wheel 38. As best seen in Fig. 5, the side wall sections 64 and 65 correspond in thickness to the laterally outer portions of the shouldered section 53 in which the rubber-like strip 51 is seated. At the point where the periphery of the seed wheel comes substantially into contact with the cut-off strip 51, and as a filled seed cell passes this point, seeds that lie outside the cell are kept from following the wheel during its rotation by the strip 51. The peripheral portions of the wheel are smooth, and therefore there is low frictional contact between the wheel and the seed. If, however, a seed should be caught between the wheel and the rubber strip and carried, as by a rolling action, along with the wheel, the strip 51 yields radially outwardly into the groove 54 to accommodate the presence of the extra seed, but due to the yieldability of the rubber strip in all directions, as soon as the extra seed has passed a given point on the strip 51, the latter closes in behind it so as to prevent other seed from following that particular seed. At all times, of course, the soft rubber-like material of the yielding strip 51 prevents any breaking or cracking of the seed, both when the seed is held back within the seed chamber 21 and when and if any seed should become jammed or wedged in between the wheel and the strip 51. Fig. 6 is a fragmentary view illustrating the action of the strip 51 in closing in against the wheel after the passage of a seed downwardly with the wheel and between the latter and the strip 51.

Two modified forms of celled hill-drop wheel are shown in Figs. 9 and 10. Referring first to Fig. 10, the wheel 70 is made up of a metal core 71 and an outer peripheral section 72 formed of soft yielding rubber-like material, the core 71 having recessed portions and the rubber-like material 72 having corresponding recessed portions 74 to form seed-receiving cells, the rubber strip 72 being of substantially uniform thickness peripherally around the wheel. In this form of the invention, as in the form shown in Figs. 1–3, if a seed should become caught between the wheel and the seed boot casting, the yieldable rubber-like material merely closes around the seed so as to accommodate the latter without breaking or cracking, it yet, at the same time, preventing other seed from following that particular seed.

The form of the invention shown in Fig. 9 is substantially like that shown in Fig. 10, except that instead of a metal core 71, the wheel in Fig. 9 employs a hard rubber core 76. Otherwise, the construction and operation of the wheel shown in Fig. 9 is like that shown in Fig. 10.

Referring again to Fig. 1, one of the side sections 29 and 31 is provided with openings 80 to provide for the discharge of dirt or the like that may find its way in between the celled hill-drop wheel and the sides of the boot casting.

While we have shown and described above the preferred structure in which the principles of the present invention have been incorporated, it is to be understood that our invention is not to be limited to the particular details shown and described above, but that, in fact, widely different means may be employed in the practice of the broader aspects of our invention.

What we claim, therefore, and desire to secure by Letters Patent is:

1. In a planter, a boot housing having an upper seed chamber and a wheel chamber disposed generally below said seed chamber and open at its lower portion to provide for discharge of seed therethrough, a generally vertical rotary hill drop wheel having a peripheral portion in which hill drop cells are formed and mounted for rotation in said housing, cut-off means carried in non-rotatable relation by said housing and including a seed cut-off portion held against movement relative to the housing but lying closely adjacent to but just out of contact with said wheel adjacent the lower portion of said chamber and extend generally from said upper seed chamber to said open portion of the wheel chamber, and one of said portions being formed of yielding rubber-like material that extends generally peripherally of the hill drop wheel from the lower portion of said upper seed chamber to said open portion so as to accommodate any seed caught between the wheel and the housing and to close about the seed as the rotation of said wheel rolls the seed along between said wheel and said cut-off portion from seed chamber to said open portion.

2. In a planter, a hill drop device comprising a hill drop wheel having a peripheral series of seed cells, a boot housing enclosing said wheel and having a seed chamber at the upper portion of said wheel, a generally vertical cushion strip of rubber-like material carried by said boot housing in generally arcuate relation about said wheel closely adjacent but spaced slightly away from the peripheral portion of the wheel a distance less than the diameter of the seed being planted, said strip at its upper portion extending away from the wheel toward said chamber, and means connecting said strip to the housing to hold it against movement with said wheel when a seed becomes caught between the wheel and strip.

3. In a hill drop planter, a planting wheel having cells in the periphery thereof to receive a plurality of seed, said wheel having smooth peripheral walls between said cells, a seed boot including a chamber to feed seed into said cells and cut-off means comprising stationary means providing an arcuately shaped section recessed at the side facing the adjacent portion of said planting wheel, one portion of said section lying adjacent said chamber and the other lying adjacent the lower portion of said wheel, a strip of flexible material resiliently yieldable in all directions and contacting only the marginal portions of said arcuate section, and means connecting said strip with said seed boot.

4. In a planter, a hill drop wheel formed as a metallic casting and having a plurality of peripherally spaced apart seed cells formed in the periphery of said wheel, the peripheral sections of said portions of the wheel lying between said seed cells being disposed in a generally cylindrical surface, each of said cells having side walls flush with the adjacent sides of the portions of the wheel between said cells, and the radially outer edges of said cell side walls being disposed a short distance radially inwardly of said cylindrical surface, whereby the outer faces of said portions of the wheel between said cells may be machined without having the machining tool contact the peripheral edges of said cell side walls.

5. In a hill drop planter, a seed boot including an upper seed chamber and a lower seed wheel chamber, said boot having an elongated recessed portion facing said wheel chamber, a cut-off strip of rubber-like material closing said recessed portion at the side thereof adjacent said chambers, and means on the seed boot engaging said strip for holding the latter in position over said recessed portion.

6. In a hill drop planter, a seed boot including an upper seed chamber and a lower seed wheel chamber, said boot having an elongated recessed portion facing said wheel chamber, and a cut-off strip of rubber-like material closing said recessed portion at the side thereof adjacent said chambers, the sides of said recessed portion having shouldered sections receiving the edges of said strip and dimensioned so that one face of said strip is substantially flush with the marginal edges of said elongated portion.

7. In a hill drop planter, a seed boot including an upper seed chamber and a lower seed wheel chamber, said boot having an elongated recessed portion facing said wheel chamber, a cut-off strip of rubber-like material closing said recessed portion at the side thereof adjacent said chambers, and means at the upper end of said recessed portion to hold said strip in position closing said recessed portion.

8. The invention set forth in claim 7, further characterized by said holding means comprising a socket in said seed boot at the upper part of said recessed portion, and interengageable lug and recess means on the upper end of said strip and in said end boot socket.

9. In a hill drop attachment for planters and the like having a rotatable seed wheel provided with peripheral seed cells, the improvement comprising cut-off means comprising a strip of flexible rubber-like material adapted to partially encircle the celled periphery of said wheel, and strip-holding means, adapted to hold said strip against said wheel when the latter is rotated relative to the strip, said strip-holding means engaging the sides and at least one end of said strip and including intermediate relieved portions spaced from the strip, whereby the latter may yield radially outwardly when a seed lies between said strip and a non-celled portion of said wheel, said strip having a sufficient resiliency to close around substantially all sides of said seed so as to prevent other seeds from following said one seed.

10. The invention set forth in claim 9, further characterized by one end of said strip being fixed to said strip-holding means whereby rotation of said seed wheel does not move said strip relative to said strip-holding means.

11. In a hill drop planter, a seed boot including an upper seed chamber and a lower seed wheel chamber, said boot having an elongated recessed portion facing and disposed in arcuate concentric relation relative to said wheel chamber, a cut-off strip of rubber-like material closing said recessed portion at the side thereof adjacent said chambers, said recessed portion having marginal sections adapted to receive the edges of said strip, leaving the generally central portions of said strip free to flex inwardly of the recessed portion and generally away from said wheel, and means holding said strip in place in said recessed portion.

12. In a hill drop planter, a seed boot including an upper seed chamber and a lower seed wheel chamber, said boot having an elongated recessed portion facing said wheel chamber, a cut-off strip of rubber-like material closing said recessed portion at the side thereof adjacent said chambers, and means adjacent one end of said recessed portion to hold said strip in position closing said recessed portion.

13. In a hill drop planter, a seed boot including an upper seed chamber and a lower seed wheel chamber, said boot having an elongated recessed portion facing and disposed in arcuate concentric relation relative to said wheel chamber, a celled seed wheel disposed in said wheel chamber and having a relatively smooth outwardly facing peripheral portion carrying seed receiving cells, said peripheral portion of said seed wheel facing said recessed portion of said boot, a cut-off strip of flexible material closing said recessed portion at the side thereof adjacent said chambers, the flexible material of said strip having a coefficient of friction materially greater than that of the smooth peripheral portion of the seed wheel, said recessed portion having marginal sections adapted to receive the edges of said strip, leaving the generally central portions of said strip free to flex inwardly of the recessed portion and generally away from said wheel, and means holding said strip in place in said recessed portion.

References Cited in the file of this patent

UNITED STATES PATENTS

| | | |
|---|---|---|
| 11,980 | Waterbury | Nov. 21, 1854 |
| 129,963 | Junkins | July 30, 1872 |
| 135,489 | Richards | Feb. 4, 1873 |
| 1,279,804 | Welcker | Sept. 24, 1918 |
| 1,309,059 | Bacon | July 8, 1919 |
| 2,475,381 | Erickson | July 5, 1949 |
| 2,605,023 | Ward | July 29, 1952 |
| 2,723,053 | Gandrud | Nov. 8, 1955 |